United States Patent
Wojciechowski

(10) Patent No.: US 11,258,630 B2
(45) Date of Patent: *Feb. 22, 2022

(54) CONTROLLER AREA NETWORK RECEIVER

(71) Applicant: TEXAS INSTRUMENTS INCORPORATED, Dallas, TX (US)

(72) Inventor: Roy David Wojciechowski, Round Rock, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,772

(22) Filed: Dec. 7, 2020

(65) Prior Publication Data

US 2021/0091972 A1    Mar. 25, 2021

Related U.S. Application Data

(63) Continuation of application No. 16/419,493, filed on May 22, 2019, now Pat. No. 10,892,911.
(Continued)

(51) Int. Cl.
*H04L 12/40* (2006.01)
*H04L 7/033* (2006.01)
*H04L 7/00* (2006.01)

(52) U.S. Cl.
CPC ...... *H04L 12/40039* (2013.01); *H04L 7/0079* (2013.01); *H04L 7/0331* (2013.01); *H04L 2012/40215* (2013.01)

(58) Field of Classification Search
CPC ............... H04L 12/40; H04L 12/40006; H04L 12/40039; H04L 12/40176;
(Continued)

(56) References Cited

U.S. PATENT DOCUMENTS 6,317,161 B1 *  11/2001  Renner ..................... H03L 7/07
                                                     327/147
6,330,034 B1 *  12/2001  Renner ................... H03L 7/087
                                                     348/505
(Continued)

OTHER PUBLICATIONS

International Search Report in corresponding PCT Patent Application No. PCT/US2019/048300, dated Dec. 5, 2019 (2 pages).

*Primary Examiner* — James M Perez
(74) *Attorney, Agent, or Firm* — John R. Pessetto; Charles A. Brill; Frank D. Cimino

(57) ABSTRACT

A controller area network receiver includes a measurement circuit, a filter circuit, and a frame detection circuit. The measurement circuit is coupled to a bit stream input terminal, and includes a timer circuit and error calculation circuitry. The timer circuit is coupled to the bit stream input terminal and a reference clock generator circuit. The error calculation circuitry is coupled to the timer circuit. The filter circuit is coupled to the measurement circuit, and includes error clipping control circuitry and clock period adjustment circuitry. The error clipping control circuitry is coupled to the error calculation circuitry. The clock period adjustment circuitry is coupled to the error calculation circuitry and the timer circuit. The frame detection circuit is coupled to the filter circuit and the bit stream input terminal.

11 Claims, 3 Drawing Sheets

Related U.S. Application Data

(60) Provisional application No. 62/723,579, filed on Aug. 28, 2018.

(58) Field of Classification Search
CPC ..... H04L 12/40202; H04L 2012/40202; H04L 2012/40208; H04L 2012/40215; H04L 61/6022; H04L 61/6027; H04L 29/12849; H04L 7/0079; H04L 7/0331
See application file for complete search history.

(56) References Cited

U.S. PATENT DOCUMENTS

| | | | | |
|---|---|---|---|---|
| 6,542,017 B2* | 4/2003 | Manganaro | G11C 27/026 | 327/291 |
| 6,545,623 B1* | 4/2003 | Yu | H03M 1/0673 | 341/154 |
| 6,876,940 B2* | 4/2005 | Mittal | G01R 31/318541 | 702/117 |
| 7,430,261 B2* | 9/2008 | Forest | H03M 13/43 | 375/364 |
| 7,433,984 B2* | 10/2008 | Das | G06F 13/372 | 710/117 |
| 7,586,953 B2* | 9/2009 | Forest | H04L 12/40026 | 370/503 |
| 7,711,888 B2* | 5/2010 | Wojciechowski | G06F 13/4059 | 710/315 |
| 7,730,361 B2* | 6/2010 | Das | G06F 11/0745 | 714/43 |
| 7,777,576 B2* | 8/2010 | Waheed | G04F 10/005 | 331/17 |
| 7,814,258 B2* | 10/2010 | Das | G06F 13/4045 | 710/305 |
| 7,818,468 B2* | 10/2010 | Richard | G06F 13/4022 | 710/10 |
| 7,877,536 B2* | 1/2011 | Wojciechowski | G06F 13/4221 | 710/301 |
| 8,391,318 B2* | 3/2013 | Hartwich | H04L 12/40169 | 370/503 |
| 9,021,292 B2* | 4/2015 | Ross | H04L 12/42 | 713/501 |
| 9,643,570 B2* | 5/2017 | Whitlock | F02N 11/0848 | |
| 10,326,583 B2* | 6/2019 | Sturm | H04L 12/40039 | |
| 10,884,069 B2* | 1/2021 | Hubbard | G01R 31/52 | |
| 10,892,911 B2* | 1/2021 | Wojciechowski | H04L 12/40039 | |
| 2004/0043739 A1* | 3/2004 | Jordanger | H04B 3/30 | 455/302 |
| 2004/0081079 A1* | 4/2004 | Forest | H03M 13/43 | 370/216 |
| 2004/0090962 A1* | 5/2004 | Forest | H04L 12/417 | 370/392 |
| 2005/0141565 A1* | 6/2005 | Forest | H03M 13/43 | 370/503 |
| 2006/0123176 A1* | 6/2006 | Fredriksson | G06F 13/4291 | 710/305 |
| 2006/0160511 A1* | 7/2006 | Trichy | H04L 12/40013 | 455/255 |
| 2008/0002788 A1* | 1/2008 | Akhtar | H04L 27/361 | 375/298 |
| 2008/0068236 A1* | 3/2008 | Sheba | G04F 10/005 | 341/118 |
| 2008/0162769 A1* | 7/2008 | Wojciechowski | G06F 13/4059 | 710/308 |
| 2008/0162836 A1* | 7/2008 | Wojciechowski | G06F 13/4234 | 711/157 |
| 2008/0192876 A1* | 8/2008 | Dulger | H03L 7/1806 | 375/376 |
| 2009/0004981 A1* | 1/2009 | Eliezer | H03F 1/3282 | 455/127.1 |
| 2009/0041104 A1* | 2/2009 | Bogdan | H04L 27/2662 | 375/226 |
| 2009/0172237 A1* | 7/2009 | Wojciechowski | G06F 13/4221 | 710/305 |
| 2009/0258612 A1* | 10/2009 | Zhuang | H03C 5/00 | 455/110 |
| 2009/0327527 A1* | 12/2009 | Richard | G06F 13/4022 | 710/10 |
| 2010/0017547 A1* | 1/2010 | Das | G06F 13/4045 | 710/35 |
| 2010/0082805 A1* | 4/2010 | Orton | H04L 43/0805 | 709/224 |
| 2011/0038388 A1* | 2/2011 | Hartwich | G06F 1/12 | 370/503 |
| 2011/0063146 A1* | 3/2011 | Matthews | H03M 3/34 | 341/118 |
| 2012/0297233 A1* | 11/2012 | Ross | H03L 7/00 | 713/502 |
| 2013/0094353 A1* | 4/2013 | Monroe | H04L 12/4135 | 370/225 |
| 2013/0318380 A1* | 11/2013 | Behrens | H04L 12/12 | 713/323 |
| 2015/0280956 A1* | 10/2015 | Bogdan | H04L 27/2656 | 375/375 |
| 2016/0212028 A1* | 7/2016 | Monroe | H04L 41/0672 | |
| 2016/0286010 A1* | 9/2016 | Lennartsson | H04L 69/10 | |
| 2017/0180062 A1* | 6/2017 | Johansen | H04W 76/27 | |
| 2018/0212792 A1* | 7/2018 | Brandt | H04L 67/12 | |
| 2018/0309590 A1* | 10/2018 | Beckmann | H04B 1/38 | |
| 2018/0337766 A1* | 11/2018 | Sturm | H04L 12/40 | |
| 2019/0052451 A1* | 2/2019 | Kaneko | H04L 12/40136 | |
| 2019/0334720 A1* | 10/2019 | Zeh | H04L 63/126 | |
| 2020/0076643 A1* | 3/2020 | Wojciechowski | H04L 7/0079 | |
| 2020/0382340 A1* | 12/2020 | Muth | H04L 12/40039 | |
| 2021/0083898 A1* | 3/2021 | Mutter | H04L 12/4015 | |
| 2021/0091972 A1* | 3/2021 | Wojciechowski | H04L 12/40032 | |
| 2021/0157293 A1* | 5/2021 | Sawada | H04L 12/46 | |

* cited by examiner

CONTROLLER AREA NETWORK RECEIVER

CROSS-REFERENCE TO RELATED APPLICATIONS

This continuation application claims priority to U.S. patent application Ser. No. 16/419,493, filed May 22, 2019, which application claims the benefit of and priority to U.S. Provisional Patent Application No. 62/723,579, filed Aug. 28, 2018, both of which are incorporated herein by reference in their entirety.

BACKGROUND

The controller area network (CAN) is a serial data communication bus topology and associated peer-to-peer message-based protocol defined by the international standards organization (ISO) 11898 standard. CAN provides communication with bit rates up to 1 Mbit/s for a variety of applications, including industrial, automotive, robotic, and motor control systems.

SUMMARY

A controller area network receiver that uses a low accuracy clock to receive a data frame is disclosed herein. In one example, a controller area network receiver includes a measurement circuit, a filter circuit, and a frame detection circuit. The measurement circuit is coupled to a bit stream input terminal, and includes a timer circuit and error calculation circuitry. The timer circuit is coupled to the bit stream input terminal and a reference clock generator circuit. The error calculation circuitry is coupled to the timer circuit. The filter circuit is coupled to the measurement circuit, and includes error clipping control circuitry and clock period adjustment circuitry. The error clipping control circuitry is coupled to the error calculation circuitry. The clock period adjustment circuitry is coupled to the error calculation circuitry and the timer circuit. The frame detection circuit is coupled to the filter circuit and the bit stream input terminal.

In another example, a method includes measuring, by a controller area network receiver, a time between a first falling edge of a packet and a second falling edge of a packet. An error in a bit time of the receiver relative to bit time of the packet is determined, by the controller area network receiver, based on the time between the first falling edge of the packet and the second falling edge of the packet. Change in value of the error is limited, by the controller area network receiver, based on previously acquired values of the error. The bit time of the receiver is adjusted, by the controller area network receiver, based on the value of the error. Whether the packet is a frame of controller area network data is detected by the controller area network receiver. Parameters used to perform the limiting and adjusting stored responsive to a previously received frame are restored based on the packet being determined to not be a frame of controller area network data.

In a further example, a controller area network receiver includes a measurement circuit, a frame detection circuit, and a filter circuit. The measurement circuit includes a timer circuit and an error calculation circuit. The timer circuit is configured to measure, a time between a first falling edge of a packet and a second falling edge of a packet. The error calculation circuit is configured to determine an error in a bit time of the controller area network receiver relative to bit time of the packet based on the time between the first falling edge of the packet and the second falling edge of the packet. The frame detection circuit is configured to detect whether the packet is a frame of controller area network data. The filter circuit is coupled to the measurement circuit and the frame detection circuit, and includes error clipping control circuitry, clock period adjustment circuitry, and state storage circuitry. The error clipping control circuitry is configured to limit change in value of the error based on previously acquired values of the error. The clock period adjustment circuitry is configured to adjust the bit time of the receiver based on the value of the error. The state storage circuitry is configured to restore, based on the packet not being a frame of controller area network data, parameters of the filter generated in a previously received frame of controller area network data

BRIEF DESCRIPTION OF THE DRAWINGS

For a detailed description of various examples, reference will now be made to the accompanying drawings in which.

DETAILED DESCRIPTION

Figure 1:
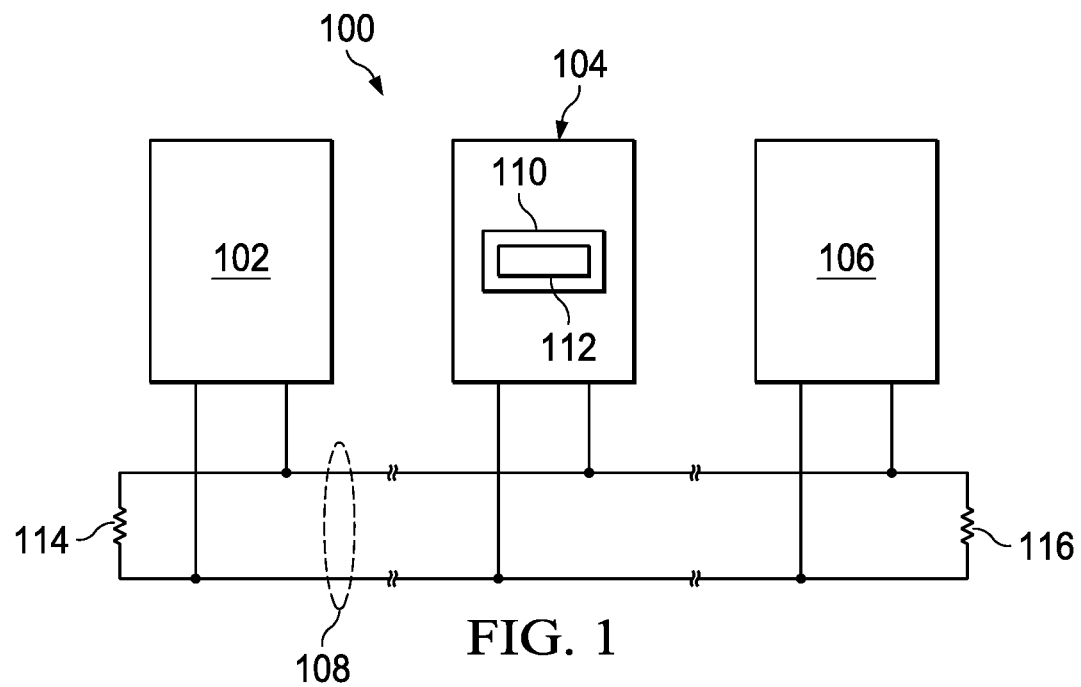
FIG. 1 shows a block diagram for an example system that includes a controller area network (CAN) in accordance with the present disclosure.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Systems that implement the controller area network (CAN) are often power sensitive. For example, some systems that provide communication via CAN are battery powered, and reducing the power consumed by CAN circuitry can extend the operational life of such systems. To reduce power consumption, CAN circuitry transitions to a low power state when not in use, and monitors the bus for communication activity. When communication directed to the CAN circuitry is detected, the CAN circuitry is fully powered.

In monitoring the CAN bus for communication activity, the CAN circuitry receives packets transmitted via the CAN bus. Packet reception includes synchronization of bit sampling in a CAN receiver with the bits transmitted via the CAN bus. Some CAN receivers include a crystal oscillator that provides an accurate clock signal for use in sampling the bits transmitted via the CAN bus. Crystal oscillators consume substantial power and the crystal oscillator remains active while the CAN bus is idle to enable packet detection for waking up the CAN circuitry.

The CAN receivers disclosed herein provide packet reception without use of a crystal oscillator. Accordingly, the power consumed by the CAN receivers may be reduced relative to other implementations of a CAN receiver. The CAN receivers of the present disclosure operate with a relatively inaccurate clock (e.g., up to +/−5% error with respect to a nominal clock frequency) that can be implemented on-chip with the receiver circuitry and consume substantially less power than a crystal oscillator. The CAN receivers are used to monitor the CAN bus for activity and wake-up the CAN circuitry when communication is detected.

The CAN receivers measure the bit timing of the bits in a received packet by measuring the time from dominant (falling) edge to dominant edge in the packet, and adjust the sampling time applied to receive bits based on the measured time and the error in receiver bit timing with respect to the measured bit times. The receiver timing locks to the packet timing within four packets. The CAN receivers identify CAN-FD (CAN Flexible Datarate) packets and roll-back any updates to receiver parameters made during reception of a CAN-FD packet by restoring receiver parameters saved prior to reception of the CAN-FD packet. Thus, parameters applied in the CAN receiver are not corrupted by CAN-FD packets or noise.

FIG. 1 shows a block diagram for an example system 100 that includes a CAN in accordance with the present disclosure. The system 100 includes device 102, device 104, and device 106 that are coupled to and communicate via the wire pair 108. Termination resistor 114 and termination resistor 116 are disposed at the extremities of the wire pair 108 to reduce signal reflections. The device 102, the device 104, and the device 106 include circuitry 110 for transmitting and receiving data via the wire pair 108 in accordance with the CAN protocols specified by the ISO 11898 standard. The circuitry 110 includes a CAN receiver 112. The CAN receiver 112 monitors the wire pair 108 for signals transmitted by another device (e.g., the device 102 or the device 104) while other circuitry of the device 104 is in a reduced power state. On detection of a CAN packet, the CAN receiver 112, or associated circuitry, wakes up the circuitry of the device 104 to process the packet in some implementations.

The CAN receiver 112 includes a low accuracy oscillator (e.g., +/−5% of a nominal frequency for sampling the bits on the wire pair 108) that is used to generate timing for sampling the bits on the wire pair 108. The CAN receiver 112 measures the bit timing of the bits in a received packet by measuring the time from dominant (falling) edge to dominant edge (e.g., time between consecutive falling edges) in the packet, and adjusts the sampling time applied to receive bits based on the measured time and the error in receiver bit timing with respect to the measured bit times. The CAN receiver 112 locks to the packet timing within four packets. The CAN receiver 112 identifies CAN-FD packets and rolls-back any updates to parameters affecting sample timing made during reception of a CAN-FD packet by restoring receiver parameters saved prior to reception of the CAN-FD packet. Because the CAN receiver 112 is able to receive CAN packets using a low accuracy oscillator, rather than a crystal oscillator, the power consumption of the CAN receiver 112 is reduced relative to CAN receiver implementations that use a crystal oscillator to detect CAN transmissions while the device is in a reduced power state.

Figure 2:
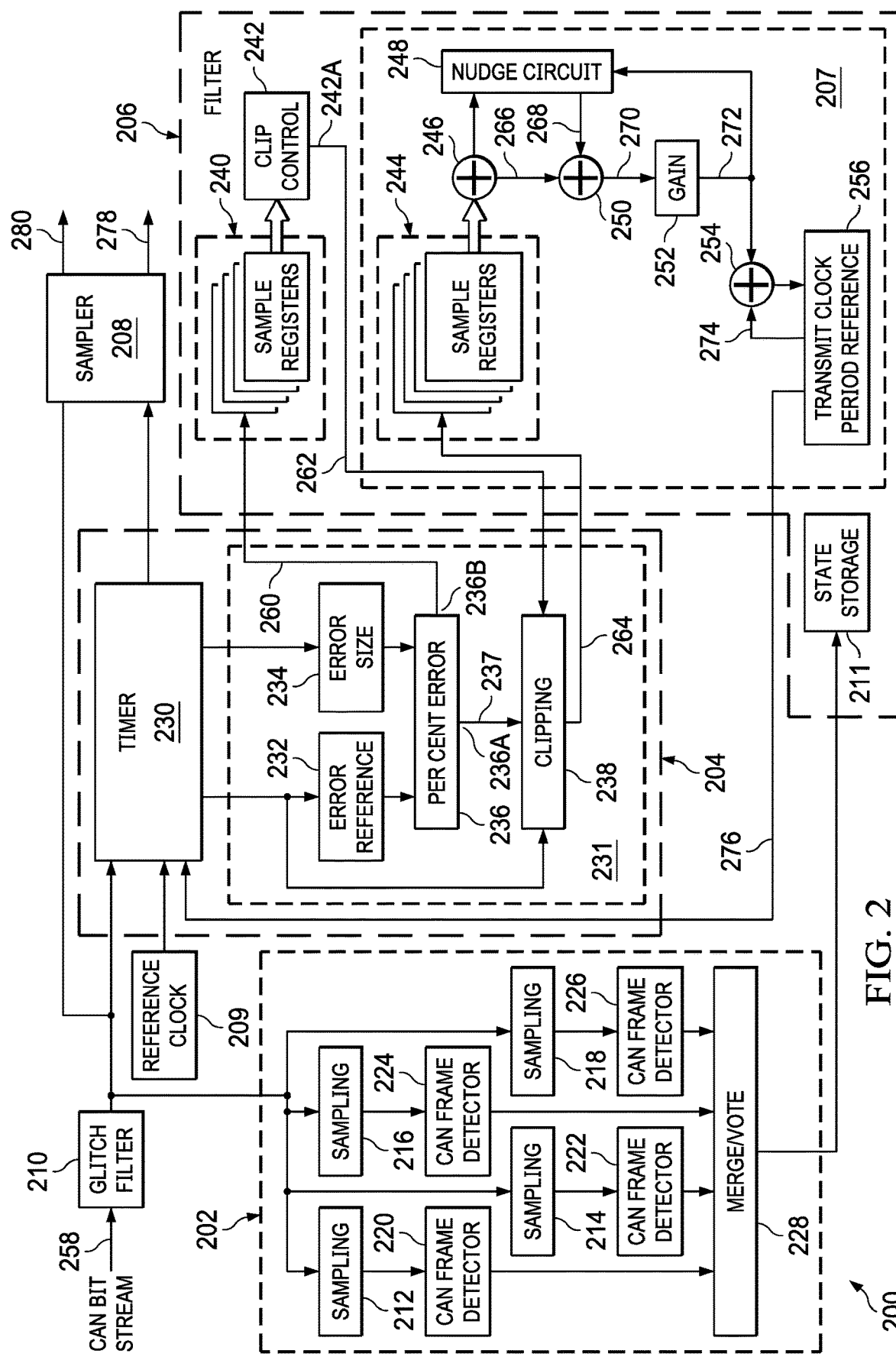
FIG. 2 shows an example CAN receiver in accordance with the present disclosure.

FIG. 2 shows an example CAN receiver 200 in accordance with the present disclosure. The CAN receiver 200 is an implementation of the CAN receiver 112. The CAN receiver 200 includes a frame detection circuit 202, a measurement circuit 204, a filter circuit 206, and a sampler circuit 208. The frame detection circuit 202 and the measurement circuit 204 are coupled to a bit stream input terminal 258 via a glitch filter circuit 210 in some implementations of the CAN receiver 200. The glitch filter circuit 210 blocks passage of pulses of less than a predetermined duration from the bit stream input terminal 258 to the frame detection circuit 202, the measurement circuit 204, and the sampler circuit 208.

The frame detection circuit 202 tests the packets received at the bit stream input terminal 258 to determine whether the packets are CAN frames. The filter circuit 206 is coupled to the measurement circuit 204 and the frame detection circuit 202, and adjusts the timing of the CAN receiver 200 for sampling received bits only with respect to CAN frames. For example, the frame detection circuit 202 distinguishes CAN frames from CAN-FD frames, and enables adjustment of the timing of bit reception based on CAN frames but not based on CAN-FD frames. The frame detection circuit 202 includes multiple sampling circuits that sample an incoming packet at different sampling rates. One or more of the sampling circuits samples the packet at a rate lower than the nominal bit rate of the CAN frame, and one or more of the sampling circuits samples the packet at rate higher than the nominal bit rate of the CAN frame. A frame detector is coupled to each of the sampling circuits to determine whether a packet as sampled by the associated sampling circuit is a CAN frame.

In the implementation of the frame detection circuit 202 shown in FIG. 2, the frame detection circuit 202 includes sampling circuit 212, sampling circuit 214, sampling circuit 216, sampling circuit 218, frame detector 220, frame detector 222, frame detector 224, and frame detector 226. The sampling circuits 212, 214, 216, and 218 are coupled to the bit stream input terminal 258. The sampling circuit 212 is coupled to the frame detector 220, the sampling circuit 214 is coupled to the frame detector 222, the sampling circuit 216 is coupled to the frame detector 224, and the sampling circuit 218 is coupled to the frame detector 226. The frame detection circuit 202 also includes a voting circuit 228 that determines, based on the outputs of the frame detectors, whether a packet is a CAN frame. The voting circuit 228 is coupled to the frame detector 220, the frame detector 222, the frame detector 224 and the frame detector 226. If at the end of a packet, any one or more of the frame detectors has determined that the packet is a CAN frame, then the voting circuit 228 identifies the packet as a CAN frame. If at any time during reception of a packet, all of the frame detectors determine that the packet is not a CAN frame, then the voting circuit 228 deems the packet not a CAN frame. The results of packet identification are provided to the filter 206 for use in updating the filter 206.

The measurement circuit 204 measures the time from dominant edge to dominant edge in a packet (e.g., a bitstream) received by the CAN receiver 200. The measurements are applied to adjust the bit reception timing of the CAN receiver 200. The measurement circuit 204 includes a timer circuit 230 and error calculation circuitry 231. The error calculation circuitry 231 is coupled to the timer circuit 230. The timer circuit 230 is coupled to a reference clock generator circuit 209, and applies a relatively inaccurate reference clock signal (e.g., +/−5% accuracy relative to a nominal frequency) generated to the reference clock generator circuit 209 to asynchronously sample the bits of a packet. The timer circuit 230 measures the time from dominant edge to dominant edge as a number of bits (CAN bits, where each bit is a predetermined number of clock cycles), a number of counts (cycles of the reference clock signal), and an offset value (time less than a clock cycle). The measurement values generated by the timer circuit 230 are provided to the error calculation circuitry 231.

The error calculation circuitry 231 generates an error value (e.g., a percent error value) based on the measurement values received from the timer circuit 230. The error value is a measurement of error in the bit timing of the CAN receiver 200 versus the bit timing of the received packet. The error calculation circuitry 231 includes, an error reference circuit 232, an error size circuit 234, a percent error circuit 236, and an error clipping circuit 238. The error reference circuit 232 determines thresholds to be compared to the measurement values provided by the timer circuit 230 based on the number of bits measured by the timer circuit 230. For example, the thresholds define 0.1 percent error references determined by multiplying the number of bits measured by the timer circuit 230 by a predetermined number of clock cycles per bit. The error size circuit 234 generates a value representing the error in receiver bit timing. For example, the error size circuit determines a difference in the count and offset values measured by the timer circuit 230 and an expected count and offset value for the number of bits received. The percent error circuit 236 is coupled to the error reference circuit 232 and the error size circuit 234. The percent error circuit 236 compares the error value generated by the error size circuit 234 to the threshold values generated by the error reference circuit 232. The comparisons approximate division by a 0.1 percent error reference to produce a percent error value 237 at an output 236A of the percent error circuit 236.

The percent error circuit 236 is coupled to the error clipping circuit 238. The error clipping circuit 238 limits the percent error value 237 provided to the filter circuit 206 based on feedback provided by the filter circuit 206. For example, the error clipping circuit 238 may limit the percent error value 237 provided to the filter circuit 206 to be within a high range, a mid-range, or low range, where the high range allows for relatively large change in the percent error value 237, the low range allows for a relatively small change in the percent error value 237, and the mid-range allows for a medium change in the percent error value 237, where medium change is greater than small change and less than large change.

Figure 3:
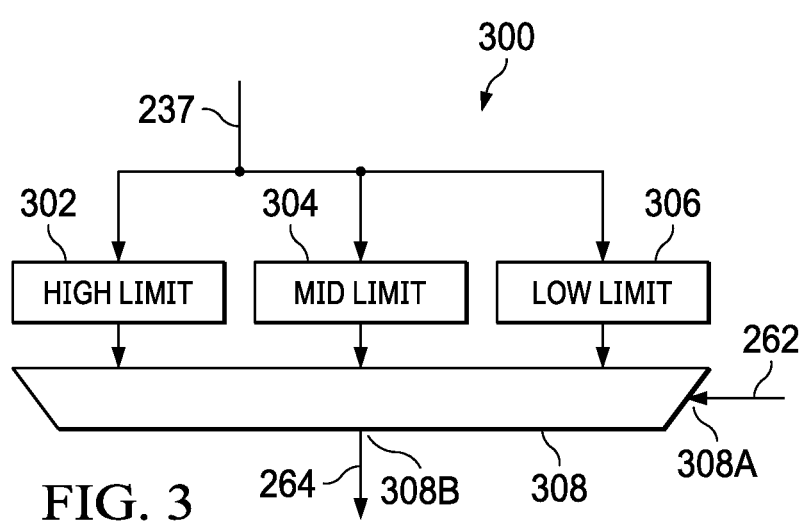
FIG. 3 shows an example clipping circuit included in a CAN receiver in accordance with the present disclosure.

FIG. 3 shows an example error clipping circuit 300. The error clipping circuit 300 is an implementation of the error clipping circuit 238. The error clipping circuit 300 includes a high limiting circuit 302, a mid-limiting circuit 304, a low limiting circuit 306, and a multiplexer 308. The multiplexer 308 is coupled to the high limiting circuit 302, the mid-limiting circuit 304, and the low limiting circuit 306. The high limiting circuit 302, the mid-limiting circuit 304, and the low limiting circuit 306 each process the percent error value 237 received from the percent error circuit 236 to limit the value of the percent error value 237 to a respective range. For example, the high limiting circuit 302 limits the percent error value 237 to a range of +/−32, the mid-limiting circuit 304 limits the percent error value 237 to a range of +/−16, and low limiting circuit 306 limits the percent error value 237 to a range of +/−8 in some implementations of the error clipping circuit 300. The multiplexer 308 selects the limited outputs of the high limiting circuit 302, the mid-limiting circuit 304, and the low limiting circuit 306 based on the signal 262 (received at a select input 308A) provided by the filter circuit 206 to generate the clipped percent error signal 264 at an output 308B.

Returning now to FIG. 2, the filter circuit 206 includes clock period adjustment circuitry 207, sample registers 240 and error clipping control circuitry 242. The error clipping control circuitry 242 is coupled to the sample registers 240. The sample registers 240 are coupled to the percent error circuit 236, and the error clipping control circuitry 242 is coupled to the error clipping circuit 238. The percent error circuit 236 generates large error signal 260 at an output 236B that indicates a large positive error or a large negative error in the timing of the CAN receiver 200. In some implementations of the CAN receiver 200, a large error is an error greater than the sampling error. The presence of large errors indicate that the relatively fast clock adjustment is needed. The sample registers 240 stores multiple samples of the large error signal 260. The sample registers 240 shown in FIG. 2 store four samples of the large error signal 260. The error clipping control circuitry 242 evaluates the large error values stored in the sample registers 240 to generate the signal 262 at output 242A that controls the error clipping circuit 238. An implementation of the error clipping control circuitry 242 operates as follows:

if (the sum of large negative errors>the sum of large positive errors), then the error clipping control circuitry 242 selects a high range for negative clipping and a low range for positive clipping in the error clipping circuit 238;

else if (the sum of large positive errors is greater than the sum of large negative errors), then the error clipping control circuitry 242 selects a high range for positive clipping and a low range for negative clipping in the error clipping circuit 238;

else the error clipping control circuitry 242 selects a mid-range for positive clipping and a mid-range for negative clipping in the error clipping circuit 238.

The clock period adjustment circuitry 207 includes sample registers 244, summation circuitry 246, nudge circuit 248, summation circuitry 250, gain circuit 252, summation circuitry 254, and clock period reference circuit 256. The sample registers 244 are coupled to the error clipping circuit 238 and the summation circuitry 246. The nudge circuit 248 is coupled to the summation circuitry 246, the summation circuitry 250, the gain circuit 252, and the summation circuitry 254. The clock period reference circuit 256 is coupled to the summation circuitry 254 and the timer circuit 230. The sample registers 244 store multiple samples of the clipped percent error signal 264 generated by the error clipping circuit 238. The sample registers 244 shown in FIG. 2 store four samples of the clipped percent error signal 264. The summation circuitry 246 sums the values of the clipped percent error signal 264 stored in the sample registers 244. The output 266 of the summation circuitry 246 (i.e., the sum of the values stored in the sample registers 244) is provided to the nudge circuit 248 and the summation circuitry 250. The summation circuitry 250 sums the output 266 of the of the summation circuitry 246 and the output 268 of the nudge circuit 248. The output 270 of the summation circuitry 250 (i.e., the sum of the output 266 and the output 268) is provided to the gain circuit 252. The gain circuit 252 multiplies the output 270 by a gain factor (e.g., $\frac{1}{16}$, $\frac{5}{64}$, etc.) to produce output 272, which defines an adjustment to be applied to the receiver clock period value stored in the clock period reference circuit 256. The summation circuitry 254 sums the output 272 and the current value of the receiver clock period 274 to generate the adjusted receiver clock period value 276 that is provided to the timer circuit 230. The adjusted receiver clock period value 276 is provided as a count value and an offset value in some implementations of the CAN receiver 200.

Figure 4:
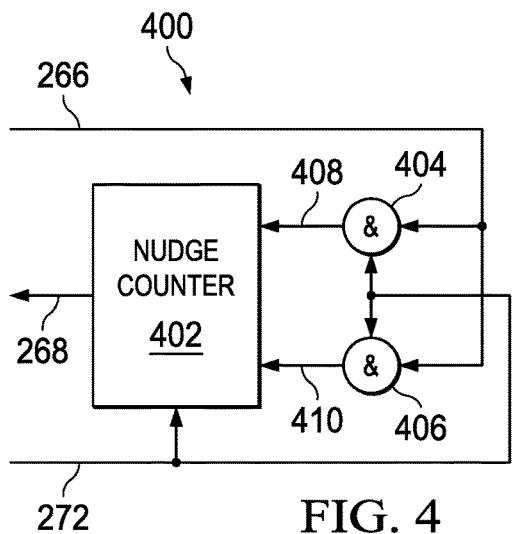
FIG. 4 shows an example nudge circuit included in a CAN receiver in accordance with the present disclosure.

The nudge circuit 248 accumulates values of the output 266 that are too small to cause the gain circuit 252 to produce an output 272. FIG. 4 shows an example nudge circuit 400. The nudge circuit 400 is an implementation of the nudge circuit 248. The nudge circuit 400 include counter 402, gating circuitry 404, and gating circuitry 406. The counter 402 is coupled to the gating circuitry 404 and the gating circuitry 406. The counter 402 is reset by the output 272. That is, when the output 272 is active to produce a change in the adjusted receiver clock period value 276, the counter 402 is reset. When the output 272 is active and the output 266 is greater than zero, the gating circuitry 404 generates a signal 408 that increments the counter 402. When the output 272 is active and the output 266 is less than zero, the gating circuitry 404 generates a signal 410 that decrements the counter 402. The counter 402 produces the output 268 that is summed with the output 266 by the summation circuitry 250 to generate the output 270 provided to the gain circuit 252.

The filter 206 also include state storage circuitry 211. At the end of each packet, the state storage circuitry 211 stores the various values generated during reception of the packet. For example, the state storage circuitry 211 stores a copy of the values in the sample registers 240, a copy of the values in the sample registers 244, a copy of the values of the clock period reference circuit 256, and/or a copy of the value of the counter 402 in shadow registers (e.g., registered dedicated to back-up storage of the values). The values stored in shadow registers are restored to the filter circuit 206 if the next received packet is not identified as a CAN frame by the frame detection circuit 202. By restoring the state of the filter produced during reception of the last identified CAN frame, the CAN receiver 200 prevents corruption of receiver timing due to adjustments made during reception of non-CAN packets.

The sampler circuit 208 is coupled to the measurement circuit 204 and the glitch filter circuit 210. The sampler circuit 208 samples the packets received by the CAN receiver 200 based on receiver bit timing information provided by the measurement circuit 204. For example, the sampler circuit 208 samples the packets received by the CAN receiver 200 based on the bits, counts, and offset values generated by the timer circuit 230. The sampler circuit 208 outputs a received bit value 278 and/or a sample time value 280 in some implementations of the sampler circuit 208.

Figure 5:
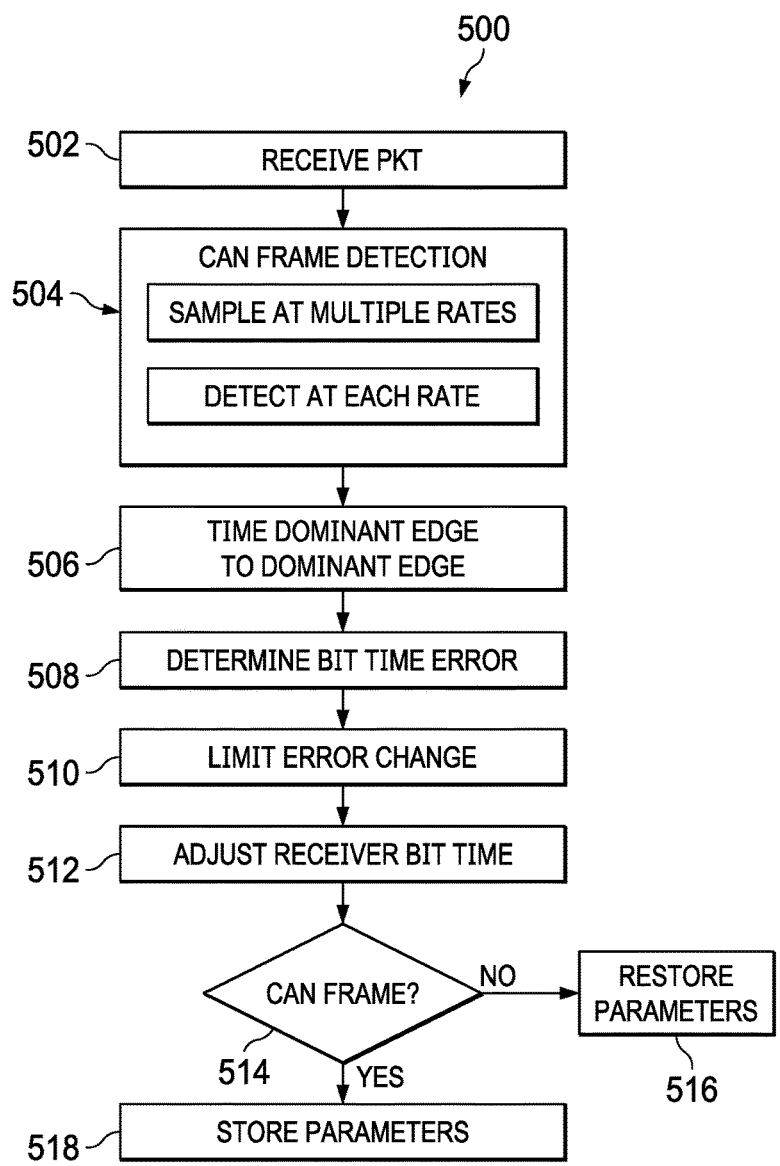
FIG. 5 shows a flow diagram for an example method for receiving a CAN packet in accordance with the present disclosure.

FIG. 5 shows a flow diagram for an example method 500 for receiving a CAN packet in accordance with the present disclosure. Though depicted sequentially as a matter of convenience, at least some of the actions shown can be performed in a different order and/or performed in parallel. Additionally, some implementations may perform only some of the actions shown. Operations of the method 500 are performed by an implementation of the CAN receiver 200.

In block 502, the CAN receiver 200 is receiving a packet.

In block 504, the frame detection circuit 202 performs CAN frame detection. The CAN frame detection includes sampling the packet being received at multiple sampling rates, where some of the sampling rates are higher than a nominal bit rate; and some sampling rates are lower than a nominal bit rate. A frame detector analyzes the results of sampling at each sampling rate to determine whether the packet is a CAN frame. The packet is deemed a CAN frame if, at the end of the packet, any frame detector identifies the packet as a CAN frame.

In block 506, the timer circuit 230 measures the time between two consecutive dominant (falling) edges of the packet. The time between the dominant edges may range from two to ten bit times.

In block 508, the error calculation circuitry 231 determines a value of the bit time error in the timing of the CAN receiver 200 based on measurement values (bits, count, and offset) provided by the timer circuit 230. The value of bit time error includes the percent error value 237.

In block 510, the error calculation circuitry 231 limits the percent error value 237 to a range selected based on prior error values generated by the error calculation circuitry 231. For example, the error calculation circuitry 231 may limit the percent error value 237 to a small range, a mid-range, or a large range depending on a magnitude and direction of change in the filter circuit 206 as defined by previous error values generated by the error calculation circuitry 231.

In block 512, the filter circuit 206 adjusts the receiver bit timing (i.e., the adjusted receiver clock period value 276) based on the clipped value of the percent error value 237 generated in block 510. The adjustment includes accumulating, in the nudge circuit 248, error that is too small to cause an adjustment in the bit time of the receiver and adding the accumulated error to the value of the error to adjust the bit time of the receiver.

In block 514, reception of the current packet is complete, and the frame detection circuit 202 identifies the packet as a CAN frame, or as not a CAN frame. If the packet is not identified as a CAN frame, then in block 516, the filter circuit 206 restores the values of the filter circuit 206 that were stored at the end of the last identified CAN frame preceding the current packet. If the packet is identified as a CAN frame, then in block 518, the filter circuit 206 stores the values of the filter circuit 206 generated by operation of the filter circuit 206 during reception of the current packet.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A controller area network receiver, comprising:
  a measurement circuit coupled to a bit stream input terminal, and comprising:
    a timer circuit coupled to the bit stream input terminal and a reference clock generator circuit, wherein the timer circuit determines a time between a first falling edge of a packet and a second falling edge of the packet; and
    error calculation circuitry coupled to the timer circuit, wherein the error calculation circuitry determines an error in a bit time of the controller area network receiver relative to a bit time of the packet based on the time between the first falling edge of the packet and the second falling edge of the packet;
  a filter circuit coupled to the measurement circuit, and comprising:
    error clipping control circuitry coupled to the error calculation circuitry, wherein the error clipping control circuitry adjusts the bit time of the controller area network receiver based on a value of the error; and clock period adjustment circuitry coupled to the error calculation circuitry and the timer circuit, wherein the clock period adjustment circuitry adjusts a period of the clock generator circuit; and a frame detection circuit coupled to the filter circuit and the bit stream input terminal, wherein the frame detection circuit detects when the packet is a frame of controller area network data.

2. The controller area network receiver of claim 1, further comprising a sampler circuit coupled to the measurement circuit.

3. The controller area network receiver of claim 1, wherein the timer circuit is configured to count:
  a number of reference clock cycles between consecutive falling edges of a bit stream received at the bit stream input terminal; and
  a number of bit times between the consecutive falling edges of the bit stream received at the bit stream input terminal.

4. The controller area network receiver of claim 1, wherein the error calculation circuitry comprises a percent error circuit configured to determine a value of percent error in a reference clock with respect to a bit stream received at the bit stream input terminal.

5. The controller area network receiver of claim 4, wherein the error calculation circuitry comprises a clipping circuit comprising:
  a first limiting circuit coupled to a first output of the percent error circuit;
  a second limiting circuit coupled to the first output of the percent error circuit;
  a third limiting circuit coupled to the first output of the percent error circuit; and
  a multiplexer coupled to the first limiting circuit, the second limiting circuit, and the third limiting circuit.

6. The controller area network receiver of claim 5, wherein:
  the error clipping control circuitry comprises an output coupled to a select input of the multiplexer and an input coupled to a plurality of sample registers; and
  the sample registers are coupled to a second output of the percent error circuit.

7. The controller area network receiver of claim 5, wherein the clock period adjustment circuitry is coupled to an output of the multiplexer, and configured to adjust a number of cycles of the reference clock corresponding to a bit time of the bit stream based on a clipped percent error signal received from the multiplexer.

8. The controller area network receiver of claim 7, wherein the clock period adjustment circuitry comprises a nudge circuit comprising a counter configured to change the number of cycles of the reference clock based on values of the clipped percent error signal accumulated over time.

9. The controller area network receiver of claim 1, wherein the frame detection circuit comprises:
  a first sampling circuit coupled to the bit stream input terminal;
  a second sampling circuit coupled to the bit stream input terminal;
  a first frame detector coupled to the first sampling circuit;
  a second frame detector coupled to the second sampling circuit; and
  a voting circuit coupled to the first frame detector and the second frame detector.

10. The controller area network receiver of claim 9, wherein:
  the first sampling circuit is configured to sample, at a first sampling rate, a bit stream received at the bit stream input terminal;
  the second sampling circuit is configured to sample, at a second sampling rate that is different from the first sampling rate, the bit stream received at the bit stream input terminal;
  the voting circuit is configured to determine that a controller area network frame has been received based on:
    the first frame detector determining that a controller area network frame has been received; or
    the second frame detector determining that a controller area network frame has been received.

11. The controller area network receiver of claim 9, wherein the filter circuit comprises state storage circuitry configured to:
  store state information at an end of a received controller area network frame; and
restore stored state information to the filter circuit responsive to the frame detection circuit determining that transitions received via the bit stream input terminal do not form a received controller area network frame.

* * * * *